United States Patent
Weng et al.

(10) Patent No.: US 8,916,239 B2
(45) Date of Patent: Dec. 23, 2014

(54) FLEXIBLE GRAPHITE SHEET AND METHOD FOR FABRICATING THE SAME AND COMPOSITE STRUCTURE FOR THE SAME

(71) Applicant: Huge Temp Energy Ltd, Hsinchu County (TW)

(72) Inventors: Ming Sheng Weng, Miaoli County (TW); Lung Ta Hsiao, Hsinchu County (TW); Che Lu Tseng, Hsinchu County (TW); Hung Yuan Li, Taipei (TW)

(73) Assignee: Huge Temp Energy Ltd, Hsinchu County (TW)

( * ) Notice: Subject to any disclaimer, the term of this patent is extended or adjusted under 35 U.S.C. 154(b) by 0 days.

(21) Appl. No.: 13/785,850

(22) Filed: Mar. 5, 2013

(65) Prior Publication Data

US 2014/0065399 A1    Mar. 6, 2014

(30) Foreign Application Priority Data

Sep. 6, 2012  (TW) .............................. 101132464 A

(51) Int. Cl.
*B05D 3/02* (2006.01)
*C01B 31/04* (2006.01)
*B05D 3/04* (2006.01)
*B05D 3/12* (2006.01)

(52) U.S. Cl.
CPC . *C01B 31/04* (2013.01); *B05D 3/02* (2013.01); *B05D 3/04* (2013.01); *B05D 3/0493* (2013.01); *B05D 3/0209* (2013.01); *B05D 3/12* (2013.01)
USPC ........... 427/379; 427/350; 427/355; 427/369; 427/370; 427/371; 427/372.2; 427/377; 427/384

(58) Field of Classification Search
None
See application file for complete search history.

(56) References Cited

U.S. PATENT DOCUMENTS

| | | | | |
|---|---|---|---|---|
| 5,443,859 A | * | 8/1995 | Nagata .......................... | 427/122 |
| 2007/0032589 A1 | | 2/2007 | Nishikawa et al. | |
| 2007/0221096 A1 | | 9/2007 | Fujihara et al. | |
| 2011/0045300 A1 | | 2/2011 | Tamaoki et al. | |
| 2011/0130494 A1 | * | 6/2011 | Penicaud et al. .............. | 524/104 |
| 2012/0012796 A1 | * | 1/2012 | Chen et al. ..................... | 252/502 |

(Continued)

FOREIGN PATENT DOCUMENTS

| CN | 102211765 | 10/2011 |
|---|---|---|
| CN | 202335192 | 7/2012 |

(Continued)

OTHER PUBLICATIONS

Office Action issued on Apr. 7, 2014 by TIPO for the counterpart TW Patent Application No. 101132464 cites CN102211765A and CN202335192U.

(Continued)

*Primary Examiner* — Erma Cameron
(74) *Attorney, Agent, or Firm* — WPAT, P.C.; Anthony King; Kay Yang

(57) ABSTRACT

The present disclosure provides a flexible graphite sheet and a method for fabricating the same and a composite structure for the same. The method for fabricating a flexible graphite sheet comprises steps of coating an augmenting solution on a first film to form a composite structure, and heating the composite structure such that the first film and the augmenting solution form a flexible graphite sheet, wherein the thermal conducting cross-section of the flexible graphite sheet is larger than the thermal conducting cross-section of the first film, and the thermal conductivity of the flexible graphite sheet ranges from 1200 to 6000 W/m° C.

8 Claims, 8 Drawing Sheets

(56) References Cited

U.S. PATENT DOCUMENTS

2012/0043691 A1 2/2012 Uekido
2012/0219719 A1* 8/2012 Yu .................................. 427/358

FOREIGN PATENT DOCUMENTS

| WO | 2005023713 A1 | 3/2005 |
|---|---|---|
| WO | 2006001270 A1 | 1/2006 |
| WO | 2010126047 A1 | 11/2010 |

OTHER PUBLICATIONS

Summary Translation of Office Action issued on Apr. 7, 2014 by TIPO for the counterpart TW Patent Application No. 101132464.
Translation of related parts in CN102211765A, Oct. 12, 2011.
Translation of related parts in CN202335192U, Jul. 11, 2012.
Office action dated Sep. 11, 2014 from the Taiwan (ROC) counterpart application 101132464.
English abstract translation of office action dated Sep. 11, 2014 from the Taiwan (ROC) counterpart application 101132464.
English abstract translation of 2010126047A1.
English abstract translation of 2006001270A1.
English abstract translation of 2005023713A1.
WO2010126047 is also published as US2012043691A1.
WO2006001270 is also published as US2007221096A1.
WO2005023713 is also published as US20070032589 A1.

* cited by examiner

FLEXIBLE GRAPHITE SHEET AND METHOD FOR FABRICATING THE SAME AND COMPOSITE STRUCTURE FOR THE SAME

BACKGROUND

1. Technical Field

The present disclosure relates to a flexible graphite sheet and a method for fabricating the same and a composite structure for the same, and more particularly, to a flexible graphite sheet with high thermal conductivity and a method for fabricating the same and a composite structure for the same.

2. Description of Related Arts

To increase the thickness of graphite sheets, the conventional method performs a high temperature sintering process on a thick polyimide film to graphitize the polyimide film. However, gases are generated as the high temperature sintering process is performed on the thick polyimide film, and the gas emissions cause the graphite sheet to crack during the graphitization process. To avoid the crack problem, the conventional method alternatively uses glue to adhere several graphite sheets into a stack with a higher thickness. However, the thermal conductivity of the glue is very low, and the overall thermal conductivity of the graphite sheet stack is also very low.

Another conventional method for increasing the thickness of graphite sheets employs the use of artificial graphite sheets and natural expanded graphite sheets, and uses a high temperature laminating process to laminate the artificial graphite sheets and the natural expanded graphite sheets into single graphite sheet bodies. However, the thermal conductivity of natural expanded graphite sheets is low and the overall thermal conductivity of laminated graphite sheets is also very low, although the thickness is increased.

SUMMARY

One aspect of the present disclosure provides a flexible graphite sheet with a high thermal conductivity and a method for fabricating the same and a composite structure for the same.

A method for preparing a flexible graphite sheet according to this aspect of the present disclosure comprises the steps of coating an augmenting solution on a first film to form a composite structure, and performing a heating process on the composite structure such that the augmenting solution and the first film form a flexible graphite sheet, wherein the thermal conducting cross-section of the flexible graphite sheet is larger than the thermal conducting cross-section of the first film, and the thermal conductivity of the flexible graphite sheet is in a range from 1200 to 6000 W/m° C.

A composite structure according to this aspect of the present disclosure comprises a first film and an augmenting layer positioned on the first film, wherein the first film is selected from the group consisting of polyimide film, carbonized polyimide film, and highly oriented pyrolytic graphite film, and the augmenting layer is selected from the group consisting of polyimide solution, carbon-containing solution, and sheet graphene.

A flexible graphite sheet according to this aspect of the present disclosure, characterized in that the flexible graphite sheet comprises a graphite sheet body with a thickness between 23 μm and 300 μm and a thermal conductivity between 1200 W/m° C. to 6000 W/m° C.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a wavelength division multiplexer/demultiplexer. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
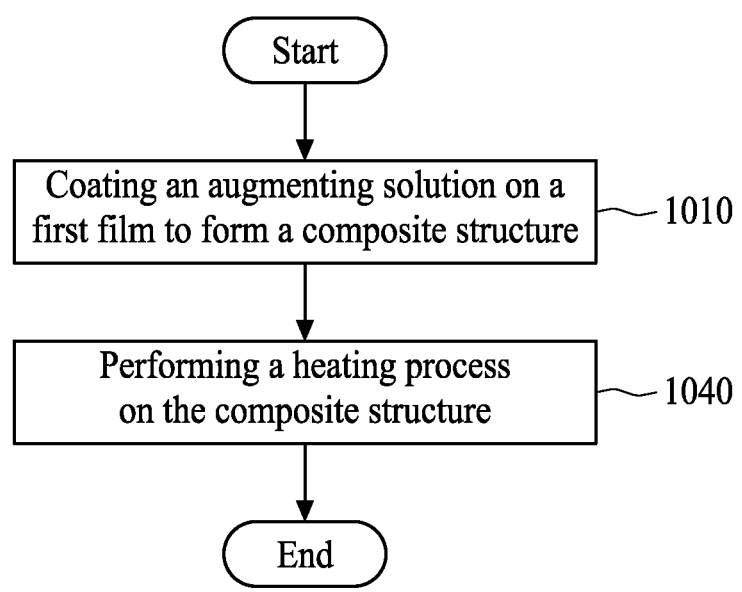
FIG. 1 is a flow chart illustrating a method for preparing a flexible graphite sheet according to one embodiment of the present disclosure.

FIG. 1 is flow chart illustrating a method for preparing a flexible graphite sheet according to one embodiment of the present disclosure, and FIG. 2 to FIG. 7 illustrate corresponding cross-sectional views for preparing the flexible graphite sheet according to one embodiment of the present disclosure. In one embodiment of the present disclosure, the method comprises a step 1010 of coating an augmenting solution on a first film to form a composite structure and a step 1040 of performing a heating process on the composite structure.

Figure 2:
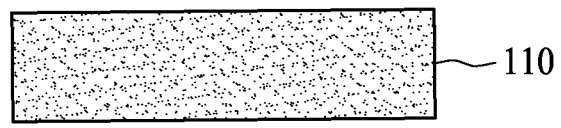
FIG. 2 illustrates a cross-sectional view of a first film for preparing the flexible graphite sheet according to one embodiment of the present disclosure.
Figure 3:
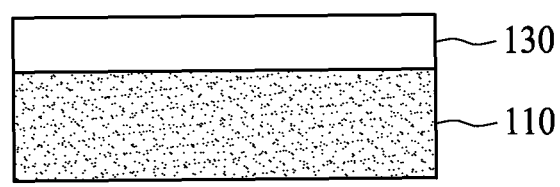
FIG. 3 illustrates a cross-sectional view of coating an augmenting solution on the first film for preparing the flexible graphite sheet according to one embodiment of the present disclosure.

Referring to FIG. 2, FIG. 3 and step 1010 in FIG. 1, in one embodiment of the present disclosure, an augmenting solution 130 is coated on a first film 110 to form a composite structure 140, wherein the first film 110 is a polyimide film, a carbonized polyimide film, or a highly oriented pyrolytic graphite film. In one embodiment of the present disclosure, the augmenting solution 130 is selected from the group consisting of polyimide solution, carbon-containing solution, and the mixture thereof. In one exemplary embodiment of the present disclosure, the polyimide solution includes a solute from 10% to 50% by weight. In another exemplary embodiment, the polyimide solution preferably includes a solute from 15% to 25% by weight. In yet another exemplary embodiment, the carbon-containing solution is a graphene solution including a solute from 0.01% to 50% by weight.

Figure 4:
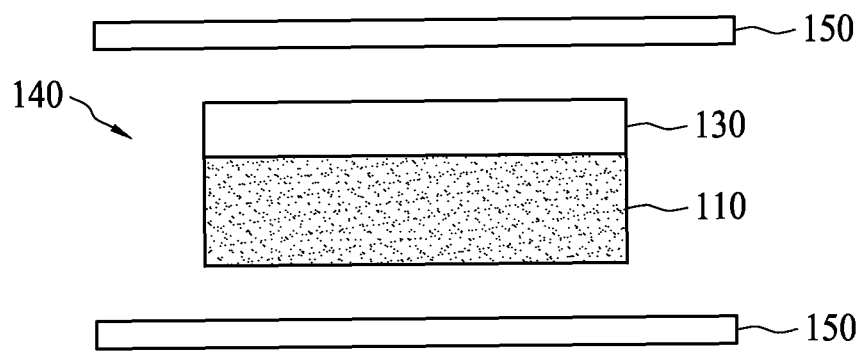
FIG. 4 and FIG. 5 illustrate cross-sectional views of applying a force on a composite structure for preparing the flexible graphite sheet according to one embodiment of the present disclosure.

Referring to FIG. 4 and step 1040 in FIG. 1, the composite structure 140 is disposed between two plates 150, such as carbon plates or graphite plates, and a force is applied to the composite structure 140 by the plates 150 and a heating process is performed on the composite structure 140, wherein the applied force is between 0.025 kg/cm$^2$ and 0.1 kg/cm$^2$.

In one embodiment of the present disclosure, the heating process is implemented by a high temperature induction furnace to heat the composite structure 140 from room temperature to 2800° C., with the use of the plates 150 to apply the force on the composite structure 140. The heating process can be performed from room temperature to a temperature between 2400° C. and 2800° C. in a stepwise manner or directly. In one embodiment of the present disclosure, the heating process is performed in a stepwise manner, with a first increment rate not larger than 2° C./min from room temperature to 1000° C. and a second increment rate not larger than 10° C./min from 1000° C. to 2800° C.

The stepwise heating technique can prevent the composite structure 140 from folding or cracking during the heating process. In one embodiment of the present disclosure, the first film 110 is a polyimide film, and the stepwise heating technique is performed by applying the force to the composite structure 140 with the plates 150 from room temperature to 1000° C., and the force can be optionally applied to the composite structure 140 from 1000° C. to 2800° C. In one embodiment of the present disclosure, the first film 110 is a carbonized polyimide film or a highly oriented pyrolytic graphite film, the heating process is performed from room temperature to a temperature between 2400° C. and 2800° C., and the force can be optionally applied to the composite structure 140.

Figure 5:
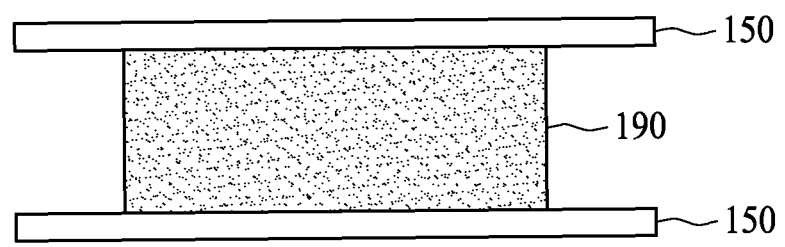
Figure 6:
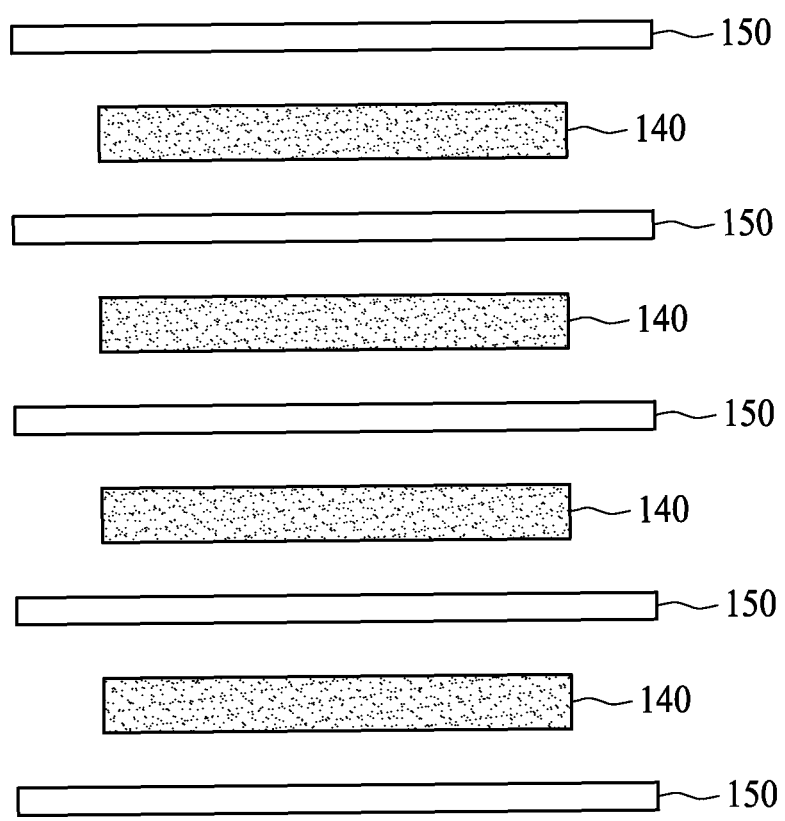
FIG. 6 illustrates a cross-sectional view of applying a force on a composite structure for preparing the flexible graphite sheet according to another embodiment of the present disclosure.
Figure 7:
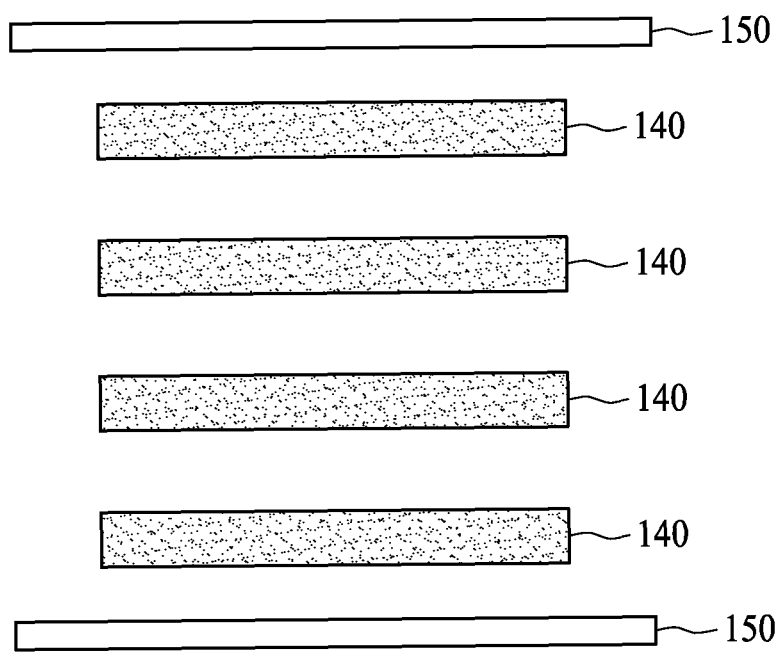
FIG. 7 illustrates a cross-sectional view of applying a force on a composite structure for preparing the flexible graphite sheet according to another embodiment of the present disclosure.

In one embodiment of the present disclosure, the graphitization temperature of the composite structure 140 is between 2400° C. and 2800° C., and heating the first film 110 and the augmenting solution 130 of the composite structure 140 to 2400° C. and 2800° C. transfers the polymer of the composite structure 140 into a flexible graphite sheet 190, as shown in FIG. 5. In addition to the single composite structure 140 in the above embodiment, the composite structure 140 and the plates 150 can stack on one another, as shown in FIG. 6 or the composite structure 140 can stack on another composite structure 140, as shown in FIG. 7, before performing the heating process.

As shown in FIG. 5, the thermal conducting cross-section of the flexible graphite sheet 190 is larger than the thermal conducting cross-section of the first film 110 (i.e., the thickness of the flexible graphite sheet 190 is larger than the thickness of the first film 110). In one embodiment of the present disclosure, the flexible graphite sheet 190 has a thickness between 23 μm and 300 μm. The conventional technique for increasing the thickness of the graphite sheet encounters a problem, in which the graphite sheet cracks due to the gas generated during the graphitization process since the thickness can accumulate up to 25 μm. In contrast, the first film 110 is formed with a balanced internal and external stress before the graphitization process, and the augmenting solution 130 is applied to increase the thickness without raising the internal stress, thereby solving the cracking problem of the conventional technique.

In addition, the conventional technique uses glue or natural graphite with low thermal conductivity to increase the thickness of the graphite sheet, but the glue or natural graphite sheet decreases the overall thermal conductivity of the graphite sheet. In contrast, the present disclosure uses the augmenting solution 130 with the first film 110, whereby the augmenting solution 130 graphitizes at a temperature between 2400° C. and 2800° C. and the thermal conductivity of the graphitized augmenting solution 130 is greater than the thermal conductivity of the glue or natural graphite. As a result, the flexible graphite sheet 190 prepared with the augmenting solution 130 has a greater overall thermal conductivity. When implementing the conventional technique, the thermal conductivity of the graphite sheet decreases to less than 1200 W/m° C. In contrast, by implementing the present technique, the thermal conductivity of the flexible graphite sheet 190 falls in a range between 1200 and 6000 W/m° C. In particular, the thermal conductivity of the flexible graphite sheet 190 does not decrease as the thickness increases according to the embodiment of the present disclosure. In one embodiment of the present disclosure, the thickness of the flexible graphite sheet 190 is between 23 μm and 300 μm, and the thermal conductivity of the flexible graphite sheet 190 is in a range from 1200 to 6000 W/m° C.

Figure 8:
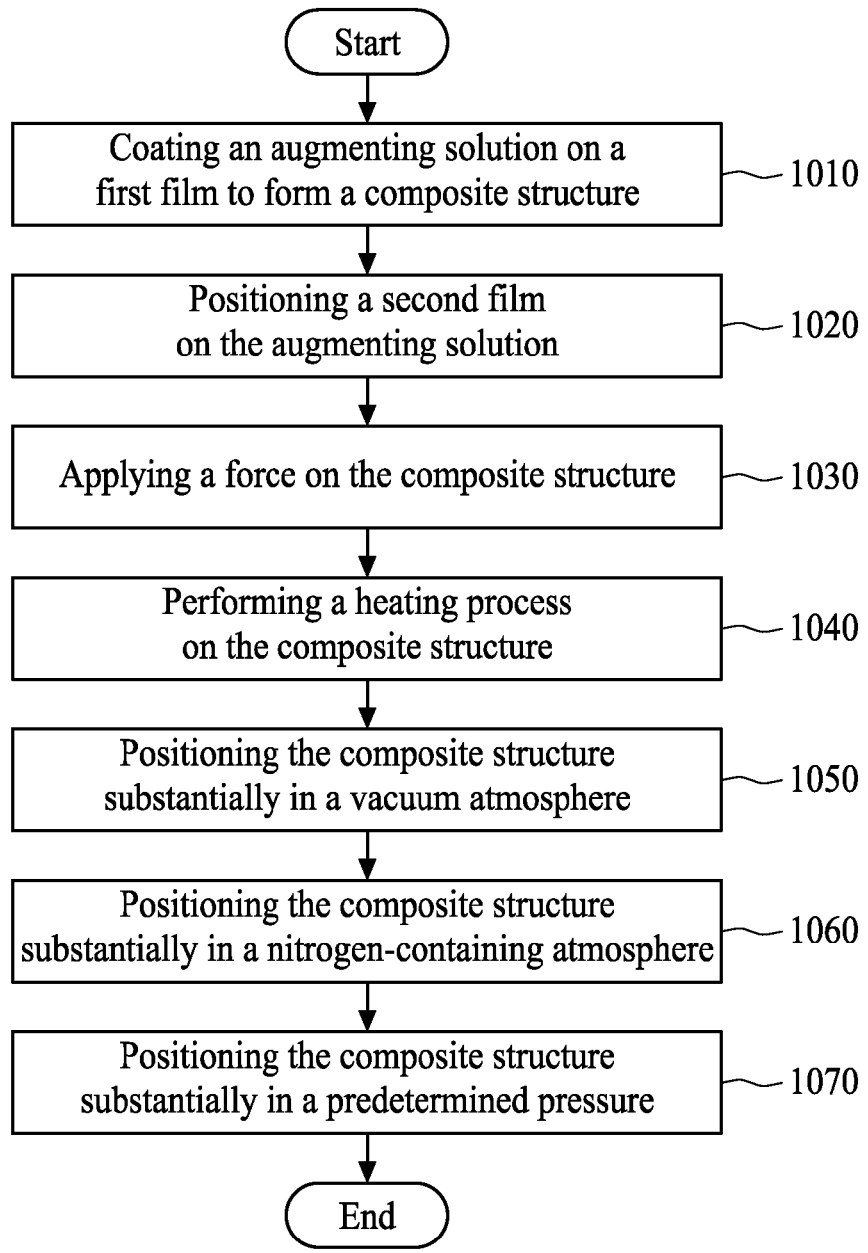
FIG. 8 is a flow chart illustrating a method for preparing a flexible graphite sheet according to another embodiment of the present disclosure.
Figure 9:
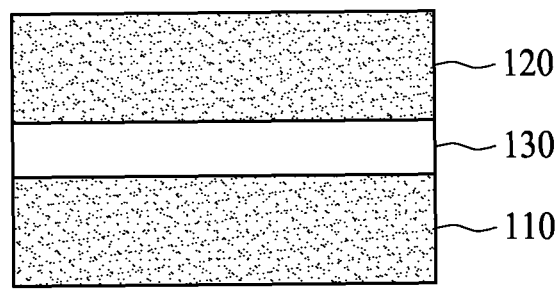
FIG. 9 illustrates a cross-sectional view of a composite structure for preparing the flexible graphite sheet according to another embodiment of the present disclosure.
Figure 10:
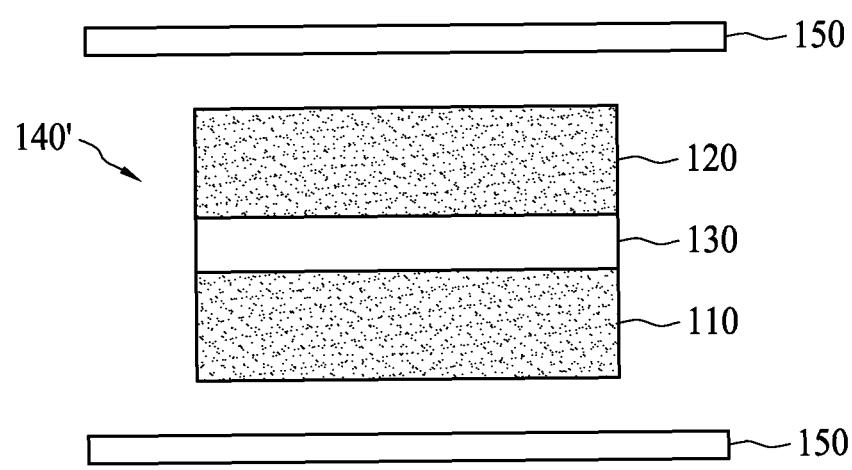
FIG. 10 and FIG. 11 illustrate cross-sectional views of applying a force on a composite structure for preparing the flexible graphite sheet according to another embodiment of the present disclosure.
Figure 11:
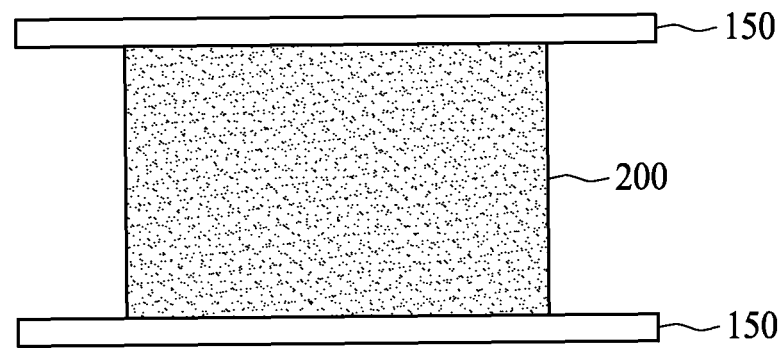

FIG. 8 is a flow chart illustrating a method for preparing a flexible graphite sheet according to another embodiment of the present disclosure, and FIG. 9 to FIG. 11 illustrate corresponding cross-sectional views for preparing the flexible graphite sheet according to one embodiment of the present disclosure. In one embodiment of the present disclosure, the method comprises: a step 1010 of coating an augmenting solution on a first film to form a composite structure; a step 1020 of positioning a second film on the augmenting solution; a step 1030 of applying a force to the composite structure; a step 1040 of performing a heating process on the composite structure; a step 1050 of positioning the composite structure substantially in a vacuum atmosphere; a step 1060 of positioning the composite structure substantially in a nitrogen-contained atmosphere; and a step 1070 of positioning the composite structure substantially in a predetermined pressure. In another embodiment of the present disclosure, step 1050, step 1060 and step 1070 may be incorporated into the flow chart of FIG. 1 individually or in combination to prepare the flexible graphite sheet.

Referring to FIG. 9 and step 1020 in FIG. 8, in one embodiment of the present disclosure, a second film 120 is positioned on the augmenting solution 130 to form a composite structure 140'. In another embodiment of the present disclosure, the composite structure 140' may be formed by injecting the augmenting solution 130 into the space between the first film 110 and the second film 120. In one embodiment of the present disclosure, the first film 110 is a polyimide film, and the second film 120 can be selected from the group consisting of polyimide film, carbonized polyimide film, and highly oriented pyrolytic graphite film, without concerning the material of the first film 110.

Referring to FIG. 10 and step 1030 in FIG. 8, in one embodiment of the present disclosure, the composite structure 140' is disposed between two plates 150 and a force is applied to the composite structure 140' by the plates 150, wherein the applied force is between 0.025 kg/cm$^2$ and 0.1 kg/cm$^2$. In another embodiment of the present disclosure, the plates 150 may apply different forces to the composite structure 140'. For example, 500 lbs and 2700 lbs are applied to the first film 110 and the second film 120 by the plates 150, respectively. The different applying forces can control the density, and the surfaces of the first film 110 and the second film 120 facing the plates 150 may have substantially the same surface roughness as the plates 150. To smoothly peel the plates 150 off the first film 110 and the second film 120, the plates 150 have a peeling surface such as a non-adhesive aluminum foil, in which the composite structure 140' can be separated from the plates 150. In one embodiment of the present disclosure, the plates 150 can be carbon plates or graphite plates.

Referring to FIG. 10 and step 1040 in FIG. 8, in one embodiment of the present disclosure, a heating process is performed on the composite structure 140'. In one embodiment of the present disclosure, the heating process is implemented by a high temperature induction furnace to heat the composite structure 140' from room temperature to 2800° C. by using the plates 150 to apply the force on the composite structure 140'. The heating process can be performed from room temperature to a temperature between 2400° C. and 2800° C. in a stepwise manner or directly. In one embodiment of the present disclosure, the graphitization temperature of the composite structure 140' is between 2400° C. and 2800° C., and heating the first film 110, the second film 120 and the augmenting solution 130 of the composite structure 140' to 2400° C. and 2800° C. transfers the polymer of the composite structure 140' into a flexible graphite sheet 200, as shown in FIG. 11.

In one embodiment of the present disclosure, the thermal conducting cross-section of the flexible graphite sheet 200 is larger than the overall thermal conducting cross-section of the first film 110 and the second film 120 (i.e., the thickness of the flexible graphite sheet 200 is larger than the overall thickness of the first film 110 and the second film 120). In one embodiment of the present disclosure, the flexible graphite sheet 200 has a thickness between 23 µm and 300 µm. The conventional technique for increasing the thickness of the graphite sheet encounters a problem, in which the graphite sheet cracks due to the gas generated during the graphitization process since the thickness can accumulate up to 25 µm. In contrast, the first film 110 and the second film 120 are formed with a balanced internal and external stress before the graphitization process, and the augmenting solution 130 is applied to combine the first film 110 and the second film 120 without raising the internal stress, thereby solving the cracking problem of the conventional technique.

In addition to preparing the flexible graphite sheet 200 from the single composite structure 140' in the above embodiment, the flexible graphite sheet 200 can also be prepared by stacking several composite structures 140' and/or the composite structure 140 and then performing the heating process. In other words, one or more than one of the composite structures 140 in FIG. 6 or FIG. 7 can be replaced by one or more than one of the composite structures 140'.

Referring back to FIG. 8, the step 1050 of positioning the composite structure 140' substantially in a vacuum atmosphere can be performed before the step 1040 of performing the heating process, wherein the vacuum atmosphere is between 0.3 torr and 0.6 torr, but preferably 0.5 torr. Subsequently, the step 1060 of positioning the composite structure 140' substantially in a nitrogen-contained atmosphere can be performed, wherein the nitrogen pressure is between 0.8 atm and 1.2 atm, but preferably 1.0 atm. In one embodiment of the present disclosure, step 1050 and step 1060 are performed once. In another embodiment of the present disclosure, step 1050 and step 1060 can be performed for several cycles. In addition, the step 1070 of positioning the composite structure 140' substantially in a predetermined pressure can be performed simultaneously with step 1040, and the predetermined pressure is between 0.02 MPa and 0.04 MPa so as to prevent external gases from diffusing into the space where the composite structure 140' is placed.

Furthermore, step 1030 and step 1040 can be performed in a partially overlap manner. For example, the plates 150, such as the metal plate, applies the force to the composite structure 140', which is simultaneously heated from room temperature to 1000° C., wherein the applied force is between 0.025 kg/cm$^2$ and 0.1 kg/cm$^2$. Subsequently, the plates 150 are removed from the composite structure 140' when heating the composite structure 140' from 1000° C. to 2800° C. Removing the plates 150 can provide more space for placing more composite structures 140' in the high temperature induction furnace, and the yield of the high temperature induction furnace can be increased. In addition, using the plates 150 to press the composite structure 140' can inhibit the generation of the gas during the graphitization process, thereby solving the cracking problem. Furthermore, positioning the composite structure 140' in the predetermined pressure between 0.02 MPa and 0.04 MPa can also inhibit the generation of the gas during the graphitization process, thereby solving the cracking problem and increasing the yield.

Figure 12:
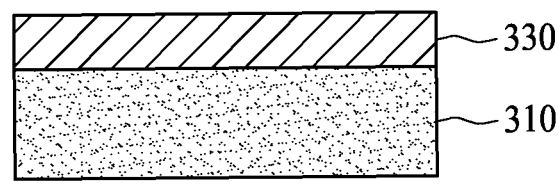
FIG. 12 illustrates a cross-sectional view of a composite structure for preparing the flexible graphite sheet according to another embodiment of the present disclosure.

FIG. 12 illustrates a cross-sectional view of a flexible graphite sheet 300 according to one embodiment of the present disclosure. In one embodiment of the present disclosure, the flexible graphite sheet 300 comprises a first film 310 and an augmenting layer 330 positioned on the first film 310. The first film 310 is selected from the group consisting of polyimide film, carbonized polyimide film, and highly oriented pyrolytic graphite film, and the augmenting layer 330 is selected from the group consisting of polyimide solution, carbon-containing solution, and sheet graphene.

In one embodiment of the present disclosure, the first film 310 is highly oriented pyrolytic graphite film, the augmenting layer 330 is sheet graphene, and the first film 310 and the augmenting layer 330 are laminated to form the flexible graphite sheet 300, rather than by a coating process. In addition, the flexible graphite sheet 300 is formed by laminating the first film 310 and the augmenting layer 330 without the heating process. The laminating process is disclosed in US 2011/0045300, which is hereby incorporated by reference as if fully set forth herein. The flexible graphite sheet 300 comprises a graphite sheet body with a thickness between 23 μm and 300 μm and a thermal conductivity between 1200 W/m° C. to 6000 W/m° C. In one embodiment of the present disclosure, a second film of highly oriented pyrolytic graphite (not shown in the drawings) can be placed on the augmenting layer 330 to form a sandwich structure consisting of two highly oriented pyrolytic graphite films with a sheet graphene therein. In another embodiment of the present disclosure, a sheet graphene layer may be laminated on the second film of the sandwich structure to increase the thickness of the graphite sheet body.

In addition, the conventional technique uses glue or natural graphite with low thermal conductivity to increase the thickness of the graphite sheet, but the glue or natural graphite sheet decreases the overall thermal conductivity of the graphite sheet. In contrast, the present disclosure uses the augmenting solution 130 with the first film 110, whereby the augmenting solution 130 graphitizes at a temperature between 2400° C. and 2800° C. and the thermal conductivity of the graphitized augmenting solution 130 is greater than the thermal conductivity of the glue or natural graphite. As a result, the flexible graphite sheet 190 prepared with the augmenting solution 130 has a greater overall thermal conductivity. When implementing the conventional technique, the thermal conductivity of the graphite sheet decreases to less than 1200 W/m° C. In contrast, by implementing the present technique, the thermal conductivity of the flexible graphite sheet 190 falls in a range between 1200 and 6000 W/m° C. In particular, the thermal conductivity of the flexible graphite sheet 190 does not decrease as the thickness increases according to the embodiment of the present disclosure. In one embodiment of the present disclosure, the thickness of the flexible graphite sheet 190 is between 23 μm and 300 μm, and the thermal conductivity of the flexible graphite sheet 190 is in a range from 1200 to 6000 W/m° C.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for preparing a flexible graphite sheet, comprising steps of:

coating an augmenting solution on a first film to form a composite structure, wherein the augmenting solution is selected from the group consisting of polyimide solution and graphene, wherein the first film is a polyimide film, a carbonized polyimide film, or a pyrolytic graphite film; and performing a heating process on the composite structure such that the augmenting solution and the first film form a flexible graphite sheet, wherein the thermal conducting cross-section of the flexible graphite sheet is larger than the thermal conducting cross-section of the first film, and the thermal conductivity of the flexible graphite sheet is in a range from 1200 to 6000 W/m° C., wherein the heating process is performed in a stepwise manner, with a first increment rate not larger than 2° C./min from room temperature to 1000° C. and a second increment rate not larger than 10° C./min from 1000° C. to 2800° C.

2. The method for preparing a flexible graphite sheet of claim 1, further comprising a step of applying a force to the composite structure, wherein the step of applying a force to the composite structure is partially overlapped with the step of performing the heating process.

3. The method for preparing a flexible graphite sheet of claim 2, wherein after the heating process, the composite structure has a graphitization temperature between 2400° C. and 2800° C.

4. The method for preparing a flexible graphite sheet of claim 2, wherein the applied force is removed from the composite structure when the temperature is between 1000° C. and 2800° C.

5. The method for preparing a flexible graphite sheet of claim 2, wherein the applied force is between 0.025 kg/cm$^2$ and 0.1 kg/cm$^2$ when the temperature is between room temperature and 1000° C.

6. The method for preparing a flexible graphite sheet of claim 1, further comprising a step of positioning the composite structure substantially in a vacuum atmosphere, in a nitrogen-contained atmosphere, in a predetermined pressure or the combination thereof after the step of performing a heating process.

7. The method for preparing a flexible graphite sheet of claim 1, further comprising a step of positioning a second film on the augmenting solution, wherein the second film is selected from the group consisting of polyimide film, carbonized polyimide film, and pyrolytic graphite film.

8. The method for preparing a flexible graphite sheet of claim 1, wherein the flexible graphite sheet has a thickness between 23 μm and 300 μm.

* * * * *